Feb. 22, 1927.  J. CHRISTENSEN, SR  1,618,914
HOIST
Filed March 15, 1926   2 Sheets-Sheet 1

Inventor
John Christensen, Sr.
By Wilkinson & Giusta
Attorneys

Feb. 22, 1927.

J. CHRISTENSEN, SR 1,618,914

HOIST

Filed March 15, 1926 2 Sheets-Sheet 2

Inventor
John Christensen, Sr.

By Wilkinson & Giusta
Attorneys

Patented Feb. 22, 1927.

1,618,914

UNITED STATES PATENT OFFICE.

JOHN CHRISTENSEN, SR., OF GALVESTON, TEXAS.

HOIST.

Application filed March 15, 1926. Serial No. 94,923.

The present invention relates to hoisting apparatus, and more particularly to a portable hoist adapted to be mounted on a tractor or the like.

An object of the present invention is to provide an attachment for a tractor which may be used without altering or changing the construction of the tractor, and which at the same time will have a relatively high capacity for lifting weights and will have a large scope or reach, and at the same time will have a wide swinging radius without tilting or dumping the tractor.

Another object of the invention is to provide a hoist attachment for tractors which may be operated simultaneously with the operation of the tractor, so that one operation of the mechanism need not be stopped for the operation of the other; this arrangement being such as to save considerable time in the handling of the loads and in the swinging of the boom during the movement of the tractor from one location to another.

A further object of the invention is to provide a tractor hoist with an upright frame constructed for mounting upon the forward end of the tractor and which may be suitably braced at the opposite sides of the tractor and also from the pivot pin of the front axle, so that the strain and load may be taken up directly from the frame, and a frame which carries the hoisting and controlling mechanism as well as supporting the boom from a relatively low position in front of the tractor.

With the foregoing and other objects in view, the invention will be more fully described hereinafter, and will be more particularly pointed out in the claims appended hereto.

In the drawings, wherein like symbols refer to like or corresponding parts throughout the several views.

Figure 1:
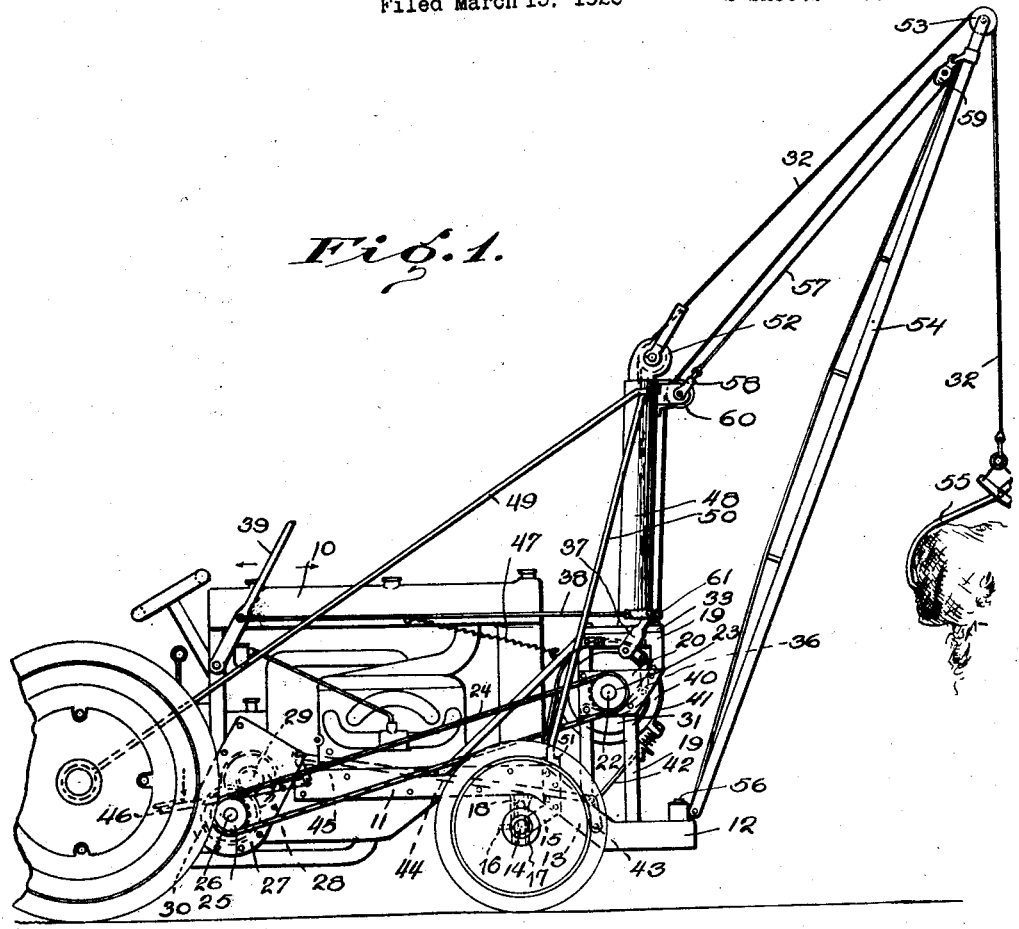
Figure 1 is a side elevation of a hoisting attachment constructed according to the present invention as applied to a tractor.
Figure 4:
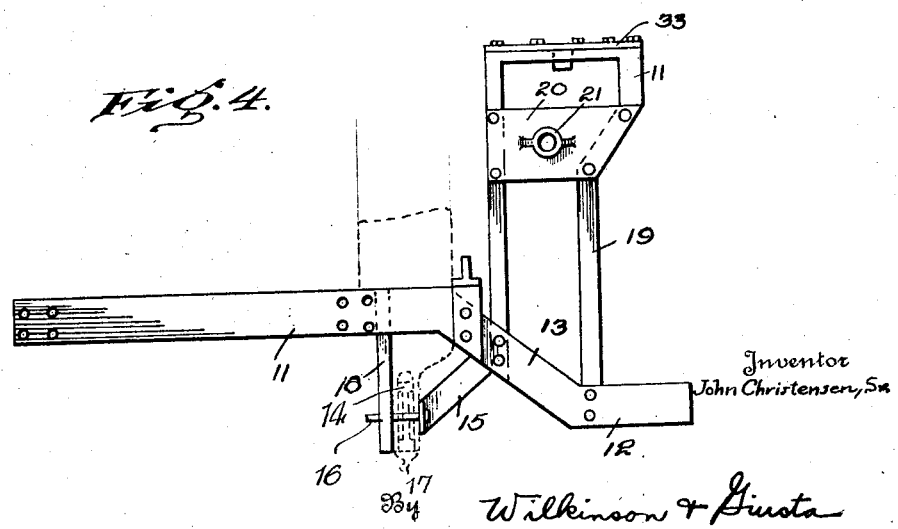
Figure 4 is a detail side elevation of the attachment frame.
Figure 2:
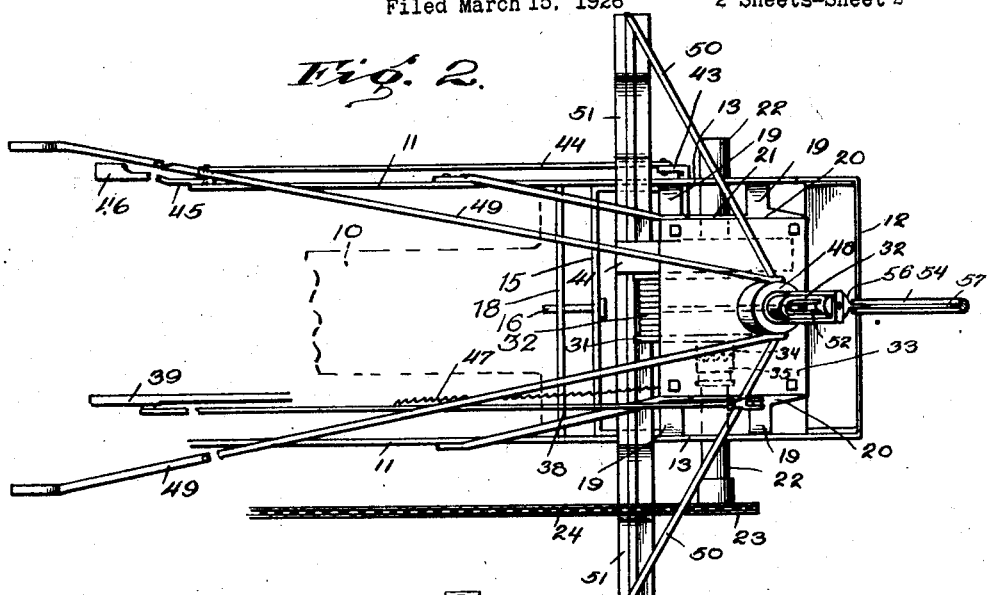
Figure 2 is a top plan view of the same.
Figure 3:
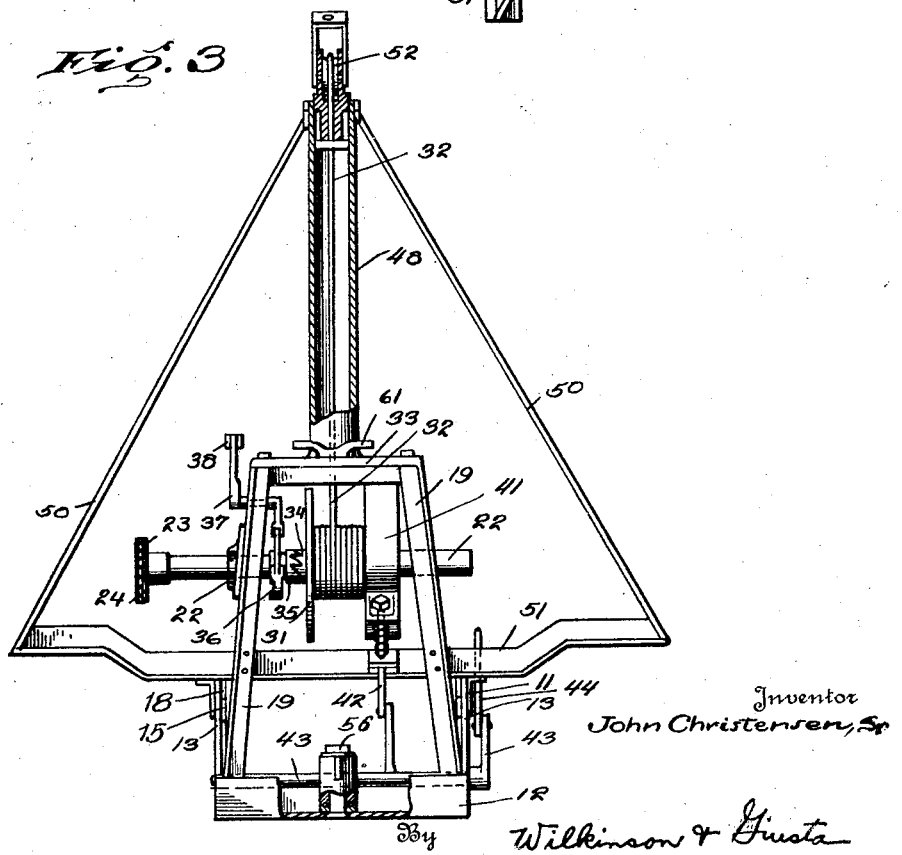
Figure 3 is a front elevation, partly in section, of the attachment hoist.

Referring to the drawings, 10 designates a tractor of approved type, which is shown in the present instance as of the Fordson type. The attachment is designed particularly for use with this type of tractor, although by slight modification it may be adapted to any other particular construction of tractor. The attachment comprises a horizontal frame 11 comprising a pair of side bars adapted to extend against the opposite sides of the tractor 10 and secured thereto by bolts, brackets or the like. The frame 11 is provided with a forward downwardly offset front end 12, which has its intermediate downwardly inclined portion 13 in advance of the front axle 14 of the tractor 10, so as to dispose the forward end 12 of the frame in close proximity to the ground. The inclined portion 13 of the frame carries a downwardly and rearwardly extending brace member 15, which is secured at opposite ends to the side portions of the frame part 13, and which at its intermediate portion is provided with a horizontal bolt 16 adapted to engage through the depending bracket 17 of the tractor for the purpose of transmitting stresses exerted upon the forward end of the attachment frame directly to the bracket 17 and the front axle 14 of the tractor. A depending bracket 18 is carried upon the upper horizontal part 11 of the attachment frame, and is adapted to receive the rear end of the bolt 16 therethrough, the bolt 16 binding the brackets 15 and 18 against the tractor bracket 17.

An upright frame 19 is mounted on the forward end of the horizontal frame and comprises pairs of uprights of angle iron, or other suitable construction, which carry at opposite sides plates 20 providing bearings 21 for supporting a drum shaft 22. At one end the drum shaft 22 extends beyond the adjacent side plate 20 and is provided with a sprocket wheel 23 receiving a chain 24 thereover. The chain 24 extends rearwardly and downwardly to a second sprocket wheel 25 mounted on the shaft 26 projecting from a transmission casing 27. This casing 27 is provided with suitable gearing, such as shown in dotted lines in Figure 1, and wherein a gear wheel 28 is connected to the drive shaft of the tractor and is provided with a pinion 29, which meshes with a second gear wheel 30 mounted on the shaft 26. The gear reduction thus provided may be of any ratio necessary for lifting the loads required.

The drum shaft 22 is provided, within the frame 19, with a drum 31 upon which a cable 32 is wound, the cable 32 extending upwardly through the top plate 33 of the frame 19. One end of the drum 31 carries a clutch element 34 while the shaft 22 is provided with a movable clutch element 35, the latter being operated by an expanding cam 36 connected by a bell crank 37 to an operating rod 38, which extends rearwardly along one side of the tractor and may be connected to a hand lever 39. The hand lever 39 is pivotally mounted upon the side of the tractor frame adjacent to the operator's seat. The shaft 22 is provided with adjustment to take care of any wear that may be on clutch and cams by nut on the shaft 22.

The handle 39 therefore controls the connecting and release of the drum 31 with respect to the shaft 22. One end of the drum 31 carries a brake drum 40 about which engages a brake band 41 operable by a rod 42 connected to the ends of the brake band 41 and extending downwardly to a rock shaft 43, which is operated by a rod 44 extending rearwardly along preferably the opposite side of the tractor 10 and connected to an upstanding arm 45 of a pedal 46 pivoted to the tractor in position for easy access of the foot of the operator. A spring 47 is carried by the frame 19 at one end and is connected at its other end to the rod 38 for normally urging the latter forwardly.

A post 48 is secured to the top plate 33 of the frame 19 and is hollow to receive the cable 32 upwardly therethrough, the post 48 being braced in upright position by a pair of rear brace rods 49 extending from the top of the post 48 rearwardly and adapted to be secured upon the rear axle housings of the tractor. The post 48 is further braced by a second pair of braces 50 which extend downwardly at opposite sides of the post 48 and are connected at their lower ends to a cross arm 51 carried upon the horizontal frame 11. The cable 32 passes upwardly through the post 48 and over a follower pulley 52 and extends therefrom and over a pulley 53 mounted upon the outer end of a boom 54. A cable 32 is suspended from the pulley 53 and is provided with a grapple 55 of any suitable type depending on the article to be lifted. The boom 54 is pivotally mounted at its lower end upon a post 56 which is carried upon the downwardly offset forward end of the horizontal frame, so that the pivotal support of the boom 54 is close to the ground. The boom 54 is held in the desired upright position by a cable 57 which is secured at one end to a pivoted clip 58 on the forward side of the post 48, and which extends over a pulley 59 carried upon the boom 54 near its outer end. The cable 57 is thence carried backwardly to the upper end of the post 48 and over a pulley 60 mounted on the post. The free end of the cable is detachably and adjustably secured to a cleat 61 mounted on the upper end of the frame 19.

In operation, the operator of the tractor may drive the tractor independently of the hand lever 39 or the pedal 46 as these devices control mechanism which is operable independently of the driving or steering mechanism of the tractor. The transmission mechanism 27 of the present invention is merely secured to the side of the tractor and is used for driving the chain 24, so that the chain is kept in motion at all times whether the tractor is moving or is at rest, the only essential part being the engine to drive the hoisting device. When it is desired to raise the grapple 55 it is only necessary to manipulate the lever 39 to interlock the clutch elements 34 and 35, so that the shaft 22 may drive the drum 31 in a direction to wind up the cable 32 thereon. As soon as the desired height of the grapple 55 is reached, the operator may throw out the clutch member 35 and depress the pedal 46, so as to release the drum from the driving mechanism and at the same time apply the brake to the drum for holding it from retrograde movement. As soon as it is desired to drop the grapple 55, it is only necessary to ease the pressure on the pedal 46 to the desired extent, so that the cable 32 may be played out at the desired speed. By adjusting the cable 57 the boom 54 may be raised or lowered to the desired angle. The boom 54 may be swung by hand, or otherwise about its post 56 from one side to the other of the tractor according to the position in which it is desired to receive and deposit the load.

It is obvious that various changes and modifications may be made in the details of construction and design of the above specifically described embodiment of this invention without departing from the spirit thereof, such changes and modifications being restricted only by the scope of the following claims.

What is claimed is:—

1. A hoisting attachment for tractors comprising a horizontal frame provided with a pair of side members adapted for attachment to the opposite sides of the tractor and having a downwardly and forwardly offset front end portion providing a platform adapted to lie in front of the tractor and support a hoisting boom, an upright frame secured to said side members in rear of the downwardly offset portion of the horizontal frame and adapted to carry hoisting means for the boom, said upright frame having a horizontal top portion adapted to support the vertical post of the boom, and a transverse beam secured across said horizontal frame adjacent to the base of the upright frame and extending at opposite sides beyond the same for anchoring the guy wires of said post.

2. A hoisting attachment for tractors comprising a horizontal frame provided with spaced side pieces for attachment against the opposite sides of the tractor and provided with a forward downwardly offset platform arranged to lie in front of the tractor, an upright frame mounted on the downwardly offset portion of the horizontal frame and arranged to extend upwardly in front of the tractor, and spaced depending cross braces arranged between said side members and said downwardly offset portion of the horizontal frame for attachment to the king bolt of a tractor to support the horizontal frame at its forward end thereon.

JNO. CHRISTENSEN, Sr.